UNITED STATES PATENT OFFICE.

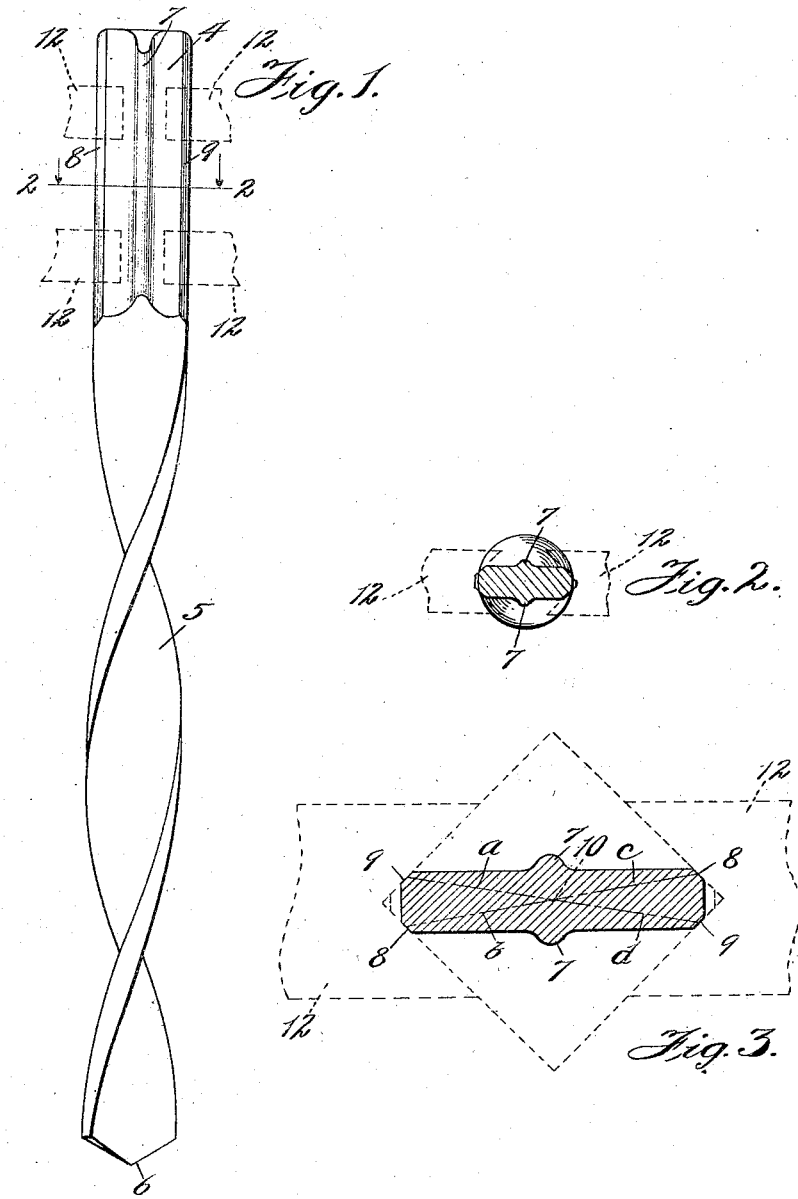

OSCAR FREDRICKSON, OF BUCHANAN, MICHIGAN, ASSIGNOR TO CELFOR TOOL COMPANY, OF CHICAGO, ILLINOIS, A CORPORATION OF ILLINOIS.

TWIST-DRILL.

No. 923,257.

Specification of Letters Patent.

Patented June 1, 1909.

Application filed December 30, 1907. Serial No. 408,587.

*To all whom it may concern:*

Be it known that I, OSCAR FREDRICKSON, a citizen of the United States, residing at Buchanan, in the county of Berrien and State of Michigan, have invented certain new and useful Improvements in Twist-Drills, of which the following is a specification, reference being had to the accompanying drawings.

My invention relates to twist drills, and its object is to provide a drill which may be readily and firmly held in a suitable chuck and held true for drilling.

It is usual in the manufacture of twist drills to provide a blank which is rolled in the form of a long strip of steel substantially rectangular in section and provided upon each of its two main parallel surfaces with a central longitudinal rib by means of which the drill is adapted to be held in chucks of well-known form and construction. The drill is then twisted so as to leave a portion of the blank in its original shape to form a shank by which the drill may be held, and it is then ground. The grinding of the drill must be between centers—that is to say, the drill is put into the grinding machine and is held in that machine between centers put into the two ends of the shank with a center punch while the blank is still hot. The drill is so ground, of course, that the edges of the twisted portion would fill a true cylinder whose cross-section is a circle. The point of the drill is then sharpened and the point must be coincident with the mathematical central line of the cylinder. Upon the shank of the drill are left two projecting ribs. It is very difficult in forming the drill to have these ribs coincident with the central line of symmetry of the drill—that is to say, with the line of the cylinder which the twisted portion of the drill would fill, as above set forth—and even with the greatest care in rolling they are apt to be a little out of line, causing difficulties with the holding of the drill in the chuck in proper and exact position for drilling. Owing also to the same difficulties in the formation of the drill it is very difficult to form the shank portion of the drill in such a way as to hold it between chuck-blocks which would engage it at its edges so as to hold it firmly and also in perfectly true drilling position. To do so it would be necessary that the shank portion of the drill should be in section an exact parallelogram whose center should be the axis of symmetry of the cutting portion of the drill and of which also the parallel faces should be parallel with the axis of rotation of the drill. It is obvious that it is very difficult to form or grind these surfaces in such a way as to fulfil the above requirements.

It is the object of my invention to produce a drill which will obviate these difficulties and which may be used both in the ordinary form of chucks which grasp the drill upon each side of its main parallel surfaces engaging the ribs thereof, and which may also be engaged by chuck-blocks from its edges. To accomplish this I grind or form upon the shank of the drill, preferably while it is being ground, bevels upon each of the four edges of the shank, which bevels shall be equidistant from the axis of symmetry of the cutting surfaces of the drill or the axis of rotation of the drill, and which shall form parts of the four sides of a parallelogram whose center coincides with the axis of rotation of the drill. In other words, the diagonally opposite bevels are parallel with each other throughout their length and the axis of symmetry of the bevels corresponds with the axis of symmetry of the cutting surfaces of the drills. This may be readily done, as is above pointed out, while the drill is being ground.

Referring to the drawings,—Figure 1 is a side elevation of a drill, showing in dotted lines chuck-blocks engaging its edges; Fig. 2 is a cross-section on line 2—2 of Fig. 1; showing also the chuck-blocks in dotted lines; Fig. 3 is an enlarged view, being a section through the shank of the drill, showing the parallelogram formed by its beveled edges.

4 indicates the shank of the drill and 5 the drill portion.

6 indicates the cutting edge at the end of the drill.

The drill, as has been explained above, is twisted from a bar of steel rolled in the form of a blank having longitudinal ribs 7, which are formed as closely as possible in the line of the axis of rotation of the drill, the drill is then twisted, leaving the shank portion 4, and ground as above described.

8—9 indicate bevels, which are ground, or otherwise formed, upon the four edges of the shank of the drill. As is best shown in Fig. 3, these edges form parts of the sides of a parallelogram indicated in dotted lines in Fig. 3, the symmetric center of which corresponds with the axis of rotation of the drill, or, in other words, the axis of symmetry of its cutting surfaces. As is also indicated in Fig. 3, these bevels are equidistant from the axis of rotation 10, the dotted lines *a*, *b*, *c* and *d* being of equal length. The planes of the bevels 8—8 and 9—9, respectively, are parallel to each other, as is shown by the dotted lines of the parallelogram in Fig. 3, and are also parallel throughout their length with the axis of rotation of the drill.

12 indicates in dotted lines a suitable form of chuck-block which may be used for engaging the bevels in the shank of my drill and may be supported in and operated by any suitable chuck.

I am filing an application of even date herewith for Letters Patent of the United States for a new and improved chuck containing chuck-blocks similar to those shown herein and adapted to operate them and support such a drill as I have above described. As such chuck and blocks are described in said application of even date herewith, and as such chuck or block forms no part of my present invention, it is believed that further description of them is unnecessary herein. It will be seen, however, from the above description that as long as the bevels are ground true, which may be readily and easily done as above pointed out, the rest of the shank of the drill may be more or less irregular and depart more or less from a true parallelogram in its several cross-sections, and its sides may vary somewhat from exact parallelism with their opposing sides and need not be ground perfectly straight and true, and the drill may still be held perfectly true for rotation and firmly and tightly in a chuck.

One of the great advantages of my drill, as above described, is that it constitutes a drill which is able to be held by chucks adapted to grip its sides and hold it in position by means of the longitudinal ribs, and which, at the same time, in cases where extreme accuracy is desired, may be held in chucks gripping it from its edges as above pointed out. While it is true, as above pointed out, that it is very difficult in the manufacture of these twist drills to get the longitudinal ribs in exact line with the center of rotation, still it may be done within a sufficient range of accuracy for many purposes in which extreme accuracy is not necessary; and this form of drill,—namely, the kind whose flat shank is engaged from its opposite sides by a suitable chuck holding it by means of the longitudinal ribs,—possesses many advantages where its use is possible. One of the advantages of holding the drill from its sides by a suitable chuck engaging the longitudinal ribs is that while accuracy may be slightly sacrificed a wide range of sizes of drills may be used in the same chuck, which may be a chuck of very simple construction. By forming, therefore, the drill shank as above described, with both the longitudinal ribs as accurately placed as possible and with the corners beveled as above set forth, a drill is formed which possesses both the advantages of the drill held by its sides by longitudinal ribs and the advantages of extreme accuracy when such accuracy is demanded.

That which I claim as my invention, and desire to secure by Letters Patent, is,—

1. A drill provided with a shank having four bearing corners formed into bevels whose axis of symmetry coincides with the axis of rotation of the drill.

2. A drill provided with a shank having four bearing corners formed into bevels, the diagonally-opposite bevels being equidistant from the axis of rotation of the drill.

3. A drill having a shank quadrilateral in cross-section, the four corners of which are beveled, the axis of symmetry of said bevels coinciding with the axis of rotation of the drill.

4. A drill having a shank quadrilateral in cross-section, the four corners of which are beveled, the axis of symmetry of said bevels coinciding with the axis of rotation of the drill and parallel throughout their length to the said axis of rotation.

OSCAR FREDRICKSON.

Witnesses:
JOHN R. LEFEVRE,
EUGENE B. CLARK.